United States Patent
Belloso (10) Patent No.: US 7,641,584 B1
(45) Date of Patent: Jan. 5, 2010

(54) VEHICLE WITH PRIMARY CRUISER ENGINE AND AUXILIARY ACCELERATOR ENGINE

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 471 days.

(21) Appl. No.: 11/705,186

(22) Filed: Feb. 21, 2007

(51) Int. Cl.
*B60K 5/08* (2006.01)
(52) U.S. Cl. .......................................................... 477/6
(58) Field of Classification Search ...................... 477/6; 180/65.21; 123/DIG. 8
See application file for complete search history.

(56) References Cited

U.S. PATENT DOCUMENTS

| | | | |
|---|---|---|---|
| 4,481,841 A | 11/1984 | Abthoff et al. | |
| 4,697,660 A | 10/1987 | Wu et al. | |
| 5,402,007 A * | 3/1995 | Center et al. | ............... 290/40 B |
| 6,594,998 B2 | 7/2003 | Bogucki | |
| 6,878,092 B1 | 4/2005 | Schustek et al. | |

* cited by examiner

*Primary Examiner*—Sherry L Estremsky
*Assistant Examiner*—Edwin A. Young
(74) *Attorney, Agent, or Firm*—Norman B. Rainer (57) ABSTRACT

A fuel-efficient automotive vehicle is provided having a power train including a primary internal combustion engine, an auxiliary engine, and a coupling system which selectively transfers power from the auxiliary engine to the primary engine when the speed of operation of the auxiliary engine equals the speed of the primary engine. The speeds of both engines are controlled by separate gas pedals conventionally located within the vehicle. The primary engine is of smaller power and better fuel efficiency than an engine which would generally be required by the vehicle. Although the primary engine can maintain the vehicle at a cruising speed, it relies upon the added power of the auxiliary engine for acceleration and hill-climbing.

6 Claims, 7 Drawing Sheets

VEHICLE WITH PRIMARY CRUISER ENGINE AND AUXILIARY ACCELERATOR ENGINE

BACKGROUND OF THE INVENTION

1. Field of the Invention

This invention relates to vehicles having multiple power sources to achieve improved fuel-efficiency for cruising without decrease in performance in acceleration and hill-climbing.

2. Description of the Prior Art

Increased global demand for vehicular fuel without corresponding increase in available fuel supply has resulted in rising gas prices and the development of vehicles with improved fuel efficiency such as hybrid vehicles which use an internal combustion engine and an electric motor adapted to augment the output of the internal combustion engine when more power is needed. Rechargeable storage batteries on the vehicle energize the electric motor.

Hybrid vehicles are complex and expensive to manufacture and maintain due to the need for high amperage capacity batteries and associated control components. One particular disadvantage of hybrid vehicles is that, when the charge of the batteries is exhausted, such as during prolonged uphill climbs, the vehicle suddenly becomes severely under-powered because the electric motor is then unable to supply the needed additional power, and the vehicle has to rely solely on the power supplied by its down-sized engine. Means to solve this problem by reducing or eliminating such dependence on expensive high-capacity batteries would be greatly desirable.

It is well known that by simply using a small displacement internal combustion engine in a vehicle instead of its standard engine, the vehicle will gain improved fuel efficiency, but will have poor acceleration performance. The literature states that a standard sedan can be maintained at a cruising speed of 55 MPH using about 8 to 15 horsepower of engine output. The market, however, requires that the vehicle can accelerate from 0 to 60 MPH within 10 to 12 seconds, otherwise the vehicle will not sell. To be marketable, it would need additional power to improve acceleration. For instance a vehicle weighing 2950 lbs. will need about 120 HP to accelerate from zero to 60 MPH within 12 seconds.

Other proposed techniques for improving fuel efficiency include use of non-hybrid vehicles having two or more engines. So far, however, this approach has not had significant success in the market mainly due to difficulties in achieving optimum coordination of the engines.

Another earlier fuel-saving approach involves means for deactivating some cylinders in a regular internal combustion engine for economical operation when less power is needed, such as when cruising on a level highway, and reactivating them when more power is needed, such as when accelerating or climbing a grade. Fuel savings through this solution, however, has been severely limited, mainly due to power losses associated with the continuing reciprocating motion of the components (pistons, con rods, etc.) within the deactivated cylinders. Means to eliminate such power loss is included in the present invention.

A review of the prior art illustrates further shortcomings in providing solutions to the aforesaid problems.

U.S. Pat. No. 6,179,098 to Belloso discloses a fuel-efficient and inexpensive automobile having two engines, each coupled to a drive wheel by way of a continuously variable ratio torque converter. Both engines are used for acceleration or hill-climbing. Either engine is then used for economical cruising. One disadvantage of this system is the limited power capacity and speed range of current continuously variable ratio torque converters.

U.S. Pat. No. 6,637,283 to Belloso discloses a Control Apparatus for a Continuously Variable Transmission (CVT) which increases its operational speed range, adds reverse functionality and provides means for it to accommodate two separate power sources. However, it does not improve power handling capacity.

U.S. Pat. No. 4,439,989 to Yamakawa discloses a system wherein two or more engine units are each coupled to a transmission through an electromagnetic power clutch. The system includes means for operating the engines at a proper phase difference of, preferably 180 degrees to prevent unwanted vibrations. This system is complex and is not readily adaptable for use in automotive vehicles, particularly for the specific purpose of improving fuel efficiency.

Other disclosures of wheeled vehicles employing multiple engines or motors are found in U.S. Pat. Nos. 4,481,841; 4,306,630; 4,475,611; 5,253,724; and 5,429,543.

U.S. Pat. No. 2,462,902 to Rockwell, et. al., discloses a vehicle with a main engine that drives the rear axle and a booster engine that drives the front axle. The main engine is associated with a power train having a clutch, speed change transmission, propeller shaft, two-speed rear axle drive gear, and a differential. The booster engine has a power train consisting of a clutch, speed change transmission, propeller shaft, disengageable rear drive, and differential. Although the dual engines of Rockwell, et. al., provide some versatility of operation, particularly when the main engine is overloaded and requires the added power of the booster engine, the several required power train components increase the cost and weight of the vehicle, and do not necessarily improve fuel efficiency.

U.S. Pat. No. 4,697,660 to Wu, et. al., discloses a vehicle powered by an internal combustion engine and an electric motor. A torque converter is disposed between the output shafts of the engine and motor. A transmission is disposed on the output shaft of the motor adjacent to a solenoid clutch. The vehicle may be powered by the engine or the motor, or by both for increased power. Electricity to energize the motor is supplied by rechargeable batteries causing the motor to be unable to provide power when the batteries are discharged during heavy duty operations. This patent does not eliminate the need for high-capacity batteries, and it does not teach use of more than one internal combustion engine in the vehicle.

U.S. Pat. No. 6,594,998 to Bogucki discloses a system combining independent, initially separate internal combustion engines wherein engines not immediately required for power are shut down and disconnected from the running engine(s) and drive train, to reduce fuel consumption. A microprocessor determines vehicle power requirements from engine sensors, and hydraulic pistons controlled by the microprocessor bring the engine units into and out of engagement with each other. Friction plates and locking pins are provided for coupling the crankshafts at predetermined relative angular positions. The need to bring the crankshafts to predetermined angular positions relative to each other so that locking pins can be used to couple the crankshafts to each other makes this system extremely complicated and prone to failure. This is further complicated by engine mount modifications to permit some engine units to be moved closer to other engine units for engagement and away from said units for disengagement, thereby increasing further the chances of failure.

U.S. Pat. No. 6,878,092 to Schustek, et. al., discloses a drive arrangement for at least one auxiliary system of a vehicle having an internal combustion engine. It provides at least one supplementary motor and a planetary gear operative between the engine and motor. The auxiliary system may be a climate control compressor. Such arrangement does not provide power to propel the vehicle, and is not useful for improving the overall fuel efficiency of the vehicle.

None of the aforesaid disclosures provide a simple and cost-effective way to improve the fuel efficiency of automotive vehicles, particularly for long distance travel on the highways. As previously discussed, the hybrid system has proved complex and expensive, especially because it requires high-capacity, high voltage batteries.

It is accordingly a primary object of this invention to provide means for improving the fuel efficiency of automotive vehicles without the need for high-capacity batteries.

It is a specific object of the present invention to use power generated by an on-board auxiliary accelerator engine for acceleration and hill-climbing, etc., instead of relying on power stored in high-capacity batteries.

It is another object of this invention to provide simple, automatic and reliable means for combining the power of said auxiliary accelerator engine with the power of a primary cruiser engine for acceleration and hill-climbing, etc., and then selectively using the power of said primary engine for economical long distance cruising on the highway.

It is also an object of the present invention to use off-the-shelf coupling means of proven reliability to couple said accelerator engine with said primary engine for increased vehicle power, and to decouple said engines for traveling economically based upon said primary engine.

It is a further object of this invention to provide add-on modification means for improving the fuel efficiency of existing motor vehicles.

It is an additional object of the present invention to provide means to modify an existing motor vehicle into an improved hybrid vehicle that does not require the use of expensive high-capacity batteries.

These objects and other objects and advantages of the invention will be apparent from the following description.

SUMMARY OF THE INVENTION

Whereas hybrid vehicles use an electric motor to provide additional power when needed to augment the power of a primary engine, the vehicle of the present invention instead employs an auxiliary internal combustion "accelerator" engine to provide said additional power. It uses both engines to accelerate and climb hills, etc., and uses only the primary engine for cruising economically.

The above and other beneficial objects and advantages are accomplished in accordance with the present invention by an automotive vehicle having power train means comprising:
a) a primary internal combustion engine of smaller size and better fuel efficiency than the usual engine currently installed in motor vehicles of similar size and weight, said primary engine having sufficient power to maintain said vehicle at an acceptable cruising speed,
b) an auxiliary accelerator internal combustion engine having an output shaft,
c) a high-capacity crankshaft in said primary engine, said crankshaft designed to withstand additional torque from said auxiliary engine in addition to the torque produced by said primary engine, said crankshaft having front and rear ends,
d) coupling means releasibly interactive between the output shaft of said auxiliary engine and the front end of said crankshaft, and
e) speed change transmission means associated with the rear end of said crankshaft, whereby
f) power from said auxiliary engine may be selectively conveyed to said crankshaft to supply additional power for accelerating said vehicle to cruising speed, and
g) after the vehicle reaches cruising speed, the accelerator engine is disengaged from said crankshaft and throttled down or stopped altogether to conserve fuel, thereby
h) enabling said vehicle to travel at cruising speed with reduced fuel consumption on power provided by said primary engine alone, and
i) enabling said auxiliary accelerator engine to remain ready to be reactivated whenever increased power is needed.

Said suitable coupling means may be a centrifugal clutch, a fluid torque converter, a CVT torque converter with movable sheaves, a cone clutch, a plate clutch, an electromagnetic power clutch, a sprag clutch or other types of releasable couplings, or combinations thereof.

BRIEF DESCRIPTION OF THE DRAWING

With these and other advantages in view, the invention is disclosed in the following description which will be more fully understood when it is read in conjunction with the following drawings in which.

For clarity of illustration, details which are not relevant to the invention, such as engine mounts, transmission mounts, undercarriage of the vehicle, and most details of the internal parts of the speed change transmission, differential and transaxle, etc., have been omitted from the aforesaid drawings.

DESCRIPTION OF THE PREFERRED EMBODIMENT

Figure 1:
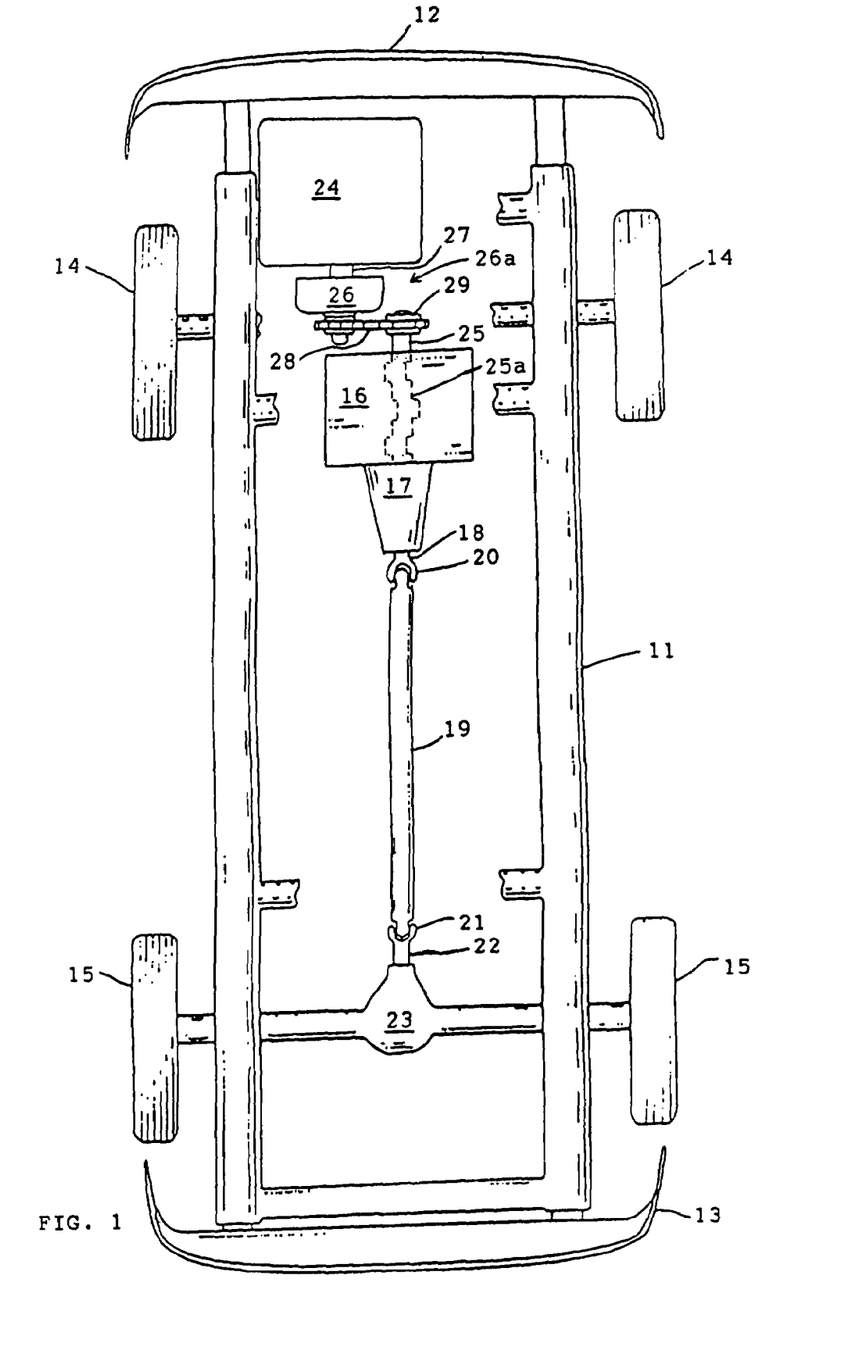
FIG. 1 is a schematic top view of an embodiment of the fuel-efficient vehicle of the present invention.

Referring now to the drawings wherein one character designates one part of the vehicle, FIG. 1 shows the vehicular chassis 11 connected to front bumper 12 and rear bumper 13, and supported by paired front wheels 14 and rear wheels 15.

A power train is shown comprised of primary "cruiser" engine 16 mounted on chassis 11 and coupled to an automatic or manual transmission 17 whose output shaft 18 is coupled to propeller shaft 19 through front universal joint 20. Propeller shaft 19 is coupled through rear universal joint 21 to pinion 22 of differential 23 which drives the driving (rear) wheels 15.

Although the power train so far described for the embodiment of FIG. 1 appears to resemble the power train of a standard front engine, rear wheel drive vehicle, in this invention it is modified in three specific ways, namely: a) primary engine 16 is of down-sized capacity to produce only enough power to maintain the vehicle at a satisfactory cruising speed with maximum fuel economy, b) it has a crankshaft 25*a* which is strong enough to withstand the power of both primary engine 16 and an accelerator engine 24, and c) the front end 25 of crankshaft 25*a* is especially adapted to receive power from accelerator engine 24 through suitable coupling means 26*a*.

Said coupling means is an assembly which includes centrifugal clutch 26 fixedly mounted on output shaft 27 of accelerator engine 24 and connected through endless chain 28 and sprocket 29 to the front end 25 of crankshaft 25*a*. Centrifugal clutch 26 is calibrated to automatically engage when accelerator engine 24 runs above a pre-selected "engagement speed" such as 1200. RPM, and to automatically disengage when accelerator engine 24 runs below said engagement speed or is stopped. The accelerator engine 24 size is selected so that its power, combined with the power of primary engine 16 will be enough to give the vehicle a satisfactory acceleration rate and performance.

Primary engine 16 and accelerator engine 24 are controlled by separate gas pedals conventionally located in the vehicle body adjacent the steering column. Both pedals may be placed side by side so that the operator may easily choose to depress both pedals together with his foot, or may selectively depress only the gas pedal of primary engine 16 for economical operation while in cruising mode. Additionally, a separate ignition switch and starter switch may be provided for accelerator engine 24 so that the accelerator engine may be stopped altogether while cruising for further fuel economy, and restarted as needed to supply additional power.

To start the vehicle, both engines are started. If the vehicle has automatic transmission, the transmission is shifted to "drive" in the usual manner, and both gas pedals are depressed to urge the vehicle forward in the usual manner, using power from both engines 16 and 24. Since both gas pedals are depressed at the same time, both engines are accelerated. In particular, accelerator engine 24 is accelerated above the engagement speed to cause centrifugal clutch 26 to be engaged and to transmit power through chain 28, sprocket 29 and crankshaft 25*a* to augment power from engine 16 and transmit their combined power to transmission 17 to accelerate the vehicle.

After the vehicle reaches cruising speed, the gas pedal for accelerator engine 24 is released, and engine 24 is throttled down to idle speed to save fuel, while the vehicle is maintained at its cruising speed by power from primary engine 16 alone. When more power is needed, the operator simply depresses both gas pedals again. When cruising for long distances, accelerator engine 24 may be stopped for more fuel savings, and restarted as necessary.

Figure 2:
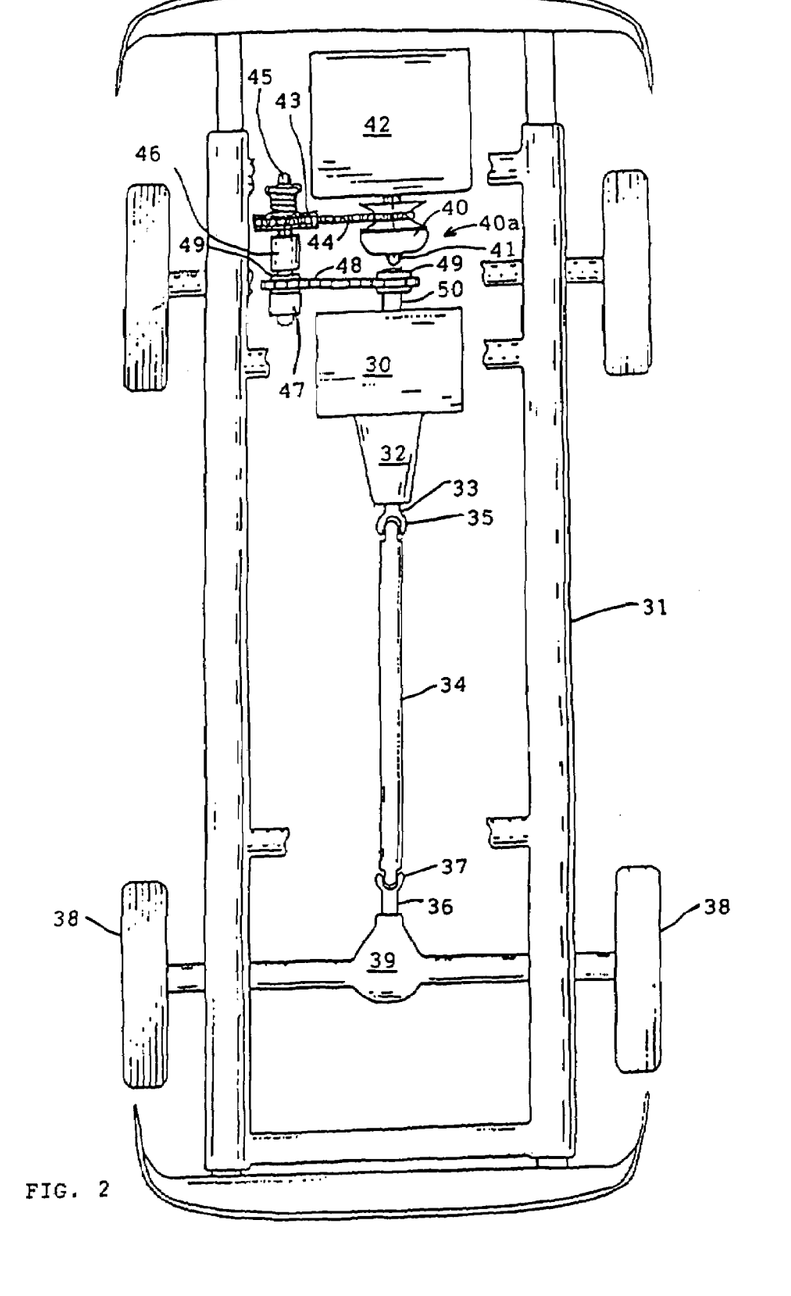
FIG. 2 is a schematic top view of a first alternative embodiment of the fuel-efficient vehicle of the present invention.

FIG. 2 shows primary engine 30 mounted on chassis 31 and connected to speed change transmission 32 whose output shaft 33 is connected to propeller shaft 34 by front universal joint 35. Propeller shaft 34 is connected to pinion 36 via rear universal joint 37 to drive rear wheels 38 by way of differential 39.

A coupling means assembly 40*a* includes CVT drive pulley 40 fixedly mounted on output shaft 41 of accelerator engine 42 and connected to CVT-driven pulley 43 by drive belt 44. Pulley 43 is fixedly mounted on jack shaft 45 which is rotatively mounted on bearings 46. The inner race of overrunning sprag clutch 47 is fixedly mounted on jack shaft 45 and rotates with it, and the outer race of sprag clutch 47 is connected through endless chain 48 and sprockets 49 to the front end 50 of the crankshaft of primary engine 30.

To operate the vehicle, both primary engine 30 and accelerator engine 42 are started, and transmission 32 is engaged. The vehicle is urged forwardly in the usual manner by accelerating both engines 30 and 42. When accelerator engine 42 is speeded up above the pre-set engagement speed, CVT drive pulley 40 engages drive belt 44 to drive pulley 43 which rotates jack shaft 45 and the inner race of sprag clutch 47 in the engagement direction, thereby causing the outer race of sprag clutch 47 to be engaged and rotate as a unit with jack shaft 45. Power from accelerator engine 42 is accordingly transmitted via CVT torque converter 40 through jack shaft 45 and sprag clutch 47 to crankshaft 50 by means of endless chain 48 and sprockets 49. This combines the power of accelerator engine 42 and primary engine 30 to drive transmission 32, propeller shaft 34, differential 39 and drive wheels 38.

After the vehicle reaches cruising speed, accelerator engine 42 is throttled down to idle speed and the vehicle is maintained at cruising speed economically by power from primary engine 30 alone. Meanwhile, since primary engine 30 will be running faster than accelerator engine 42, the sprag clutch will automatically disengage its outer race from the inner race, placing the outer race in a free-wheeling state so that accelerator engine 42 will not cause a drag on primary engine 30, particularly if the CVT torque converter drive pulley 40 is not fully disengaged from drive belt 44. For further fuel economy, accelerator engine 42 may be stopped altogether while cruising, and can remain ready to be restarted, speeded up, and automatically engaged whenever more power is needed.

The CVT torque converter can multiply the torque of the accelerator engine 42 up to five times, a feature which may be used to improve acceleration performance, or used to reduce the size and weight of the accelerator engine itself without sacrificing acceleration performance.

Figure 3:
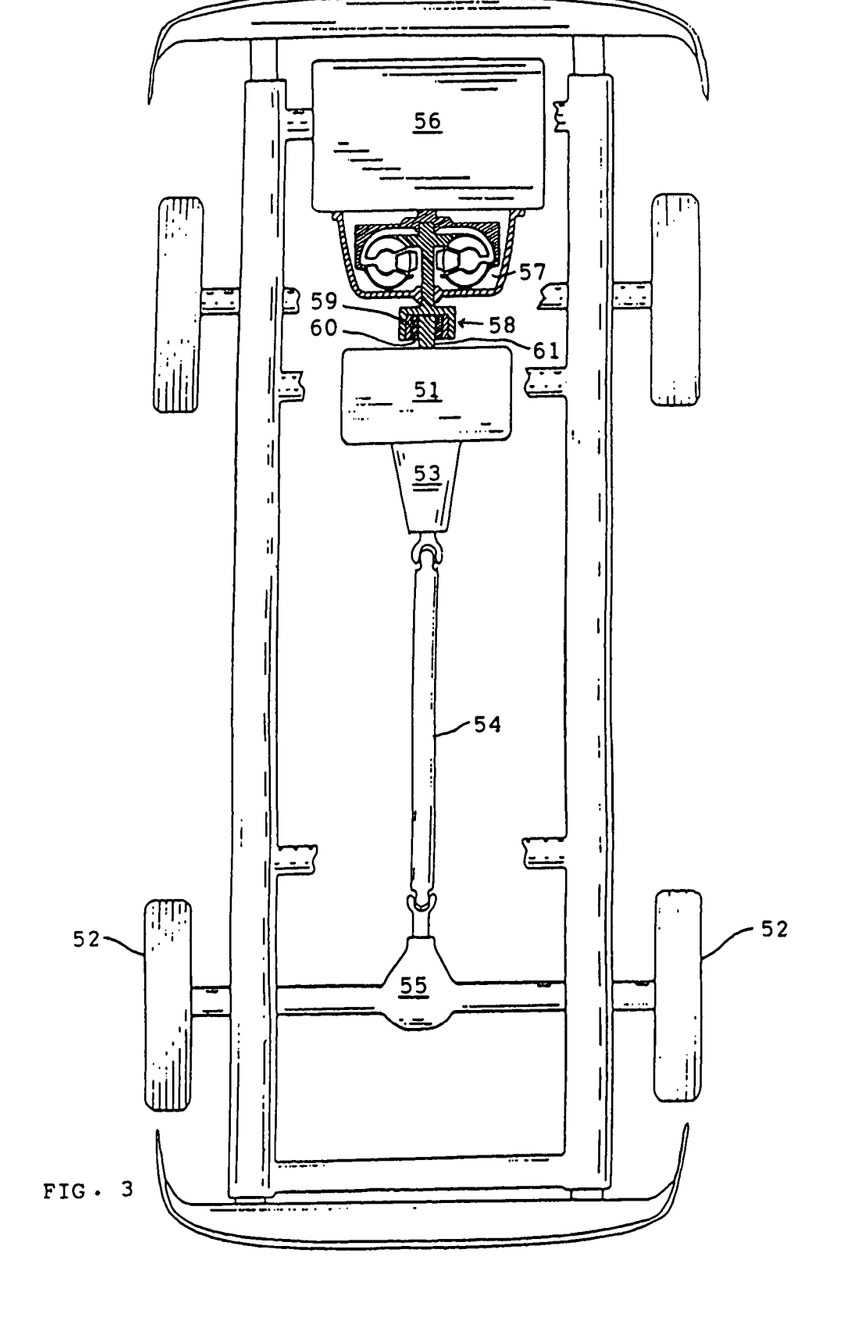
FIG. 3 is a schematic top view of a second alternative embodiment of the fuel-efficient vehicle of the present invention.

In FIG. 3, primary engine 51 transmits power to drive wheels 52 via transmission 53, propeller shaft 54 and differential 55 in the conventional manner. Accelerator engine 56 is coupled to a fluid torque converter 57 which is connected to the outer (driver) race 59 of sprag clutch 58 whose inner (driven) race 60 is mounted on the front end 61 of the crankshaft of primary engine 51. Accelerator engine 56 and primary engine 51 are mounted in coaxial alignment. Sprag clutch 58 is mounted so that it automatically engages when accelerator engine 56 exceeds the speed of primary engine 51, and automatically disengages when accelerator engine 56 runs slower than primary engine 51. The fluid torque converter 57 allows variations in the speed and power of accelerator engine 56 relative to the primary engine 51, and for smoother engagement and disengagement of the two power sources.

To operate the vehicle, both engines 51 and 56 are started, the transmission 53 is engaged and both engines are accelerated to urge the vehicle forward in the usual manner. To cruise economically after the vehicle reaches cruising speed, accelerator engine 56 is simply throttled down or stopped altogether. To accelerate or climb hills, accelerator engine is restarted and speeded up as needed.

Figure 4:
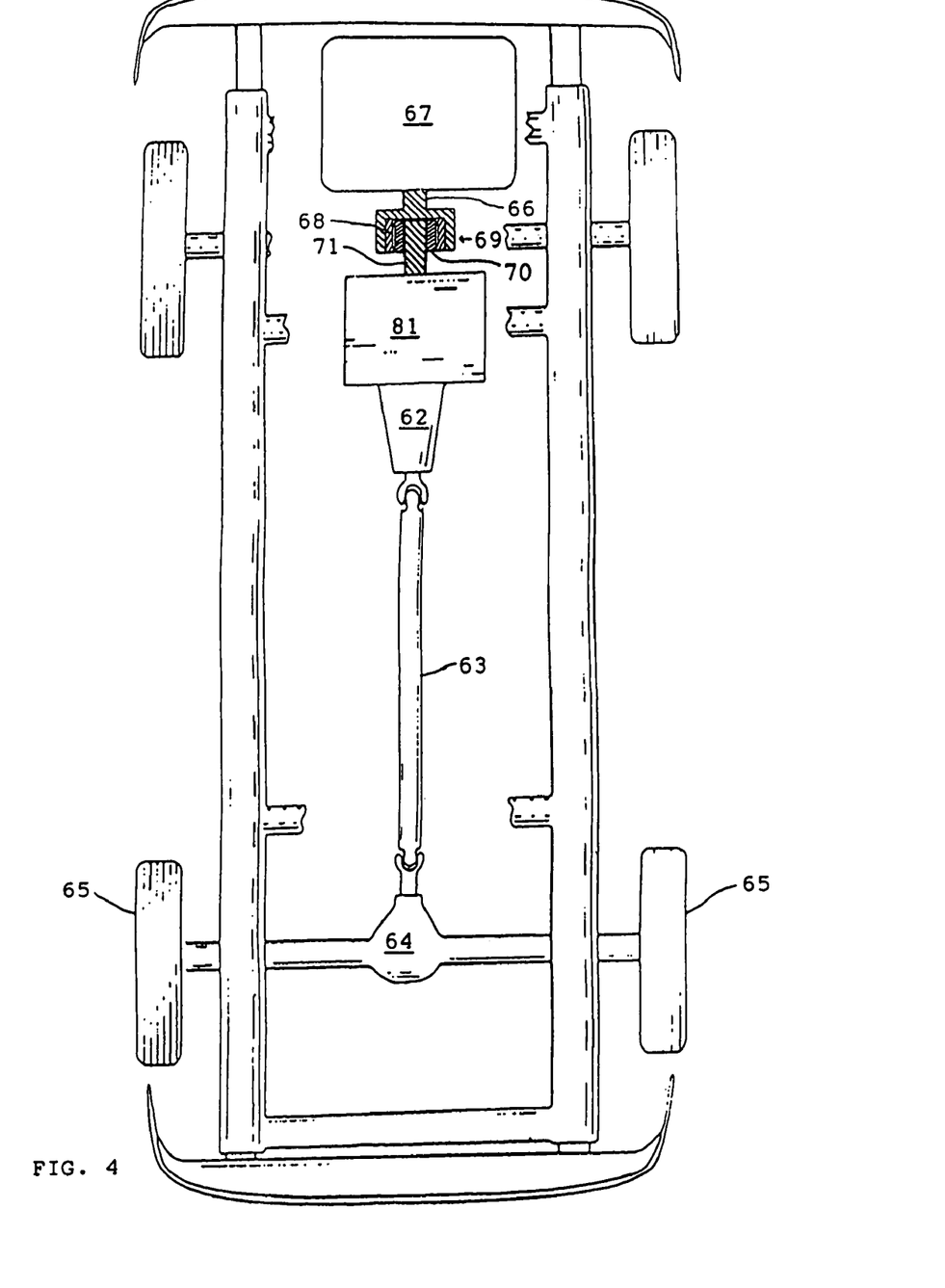
FIG. 4 is a schematic top view of a third alternative embodiment of the fuel-efficient vehicle of the present invention.

In FIG. 4, primary engine 81 is mated to transmission 62, propeller shaft 63, differential 64 and drive wheels 65 in the conventional manner. The output shaft 66 of accelerator engine 67 is directly coupled to the outer (drive) race 68 of sprag clutch 69 whose inner (driven) race 70 is fixedly mounted on the front end 71 of the crankshaft of primary engine 81. This arrangement eliminates the use of a torque converter and yet permits automatic coupling of accelerator engine 67 to primary engine 81 for acceleration and automatic de-coupling of said engines for economical cruising.

To operate the vehicle, both engines 81 and 67 are started, then the transmission is engaged and both engines are speeded up to urge the vehicle forward in the usual manner.

After the vehicle reaches cruising speed, accelerator engine 67 is throttled down or stopped altogether to save fuel and cruise economically on power from primary engine 81 alone. When more power is needed, accelerator engine 67 is simply restarted and/or speeded up, and sprag clutch 69 will automatically couple it to primary engine 81 to add power as needed.

Figure 5:
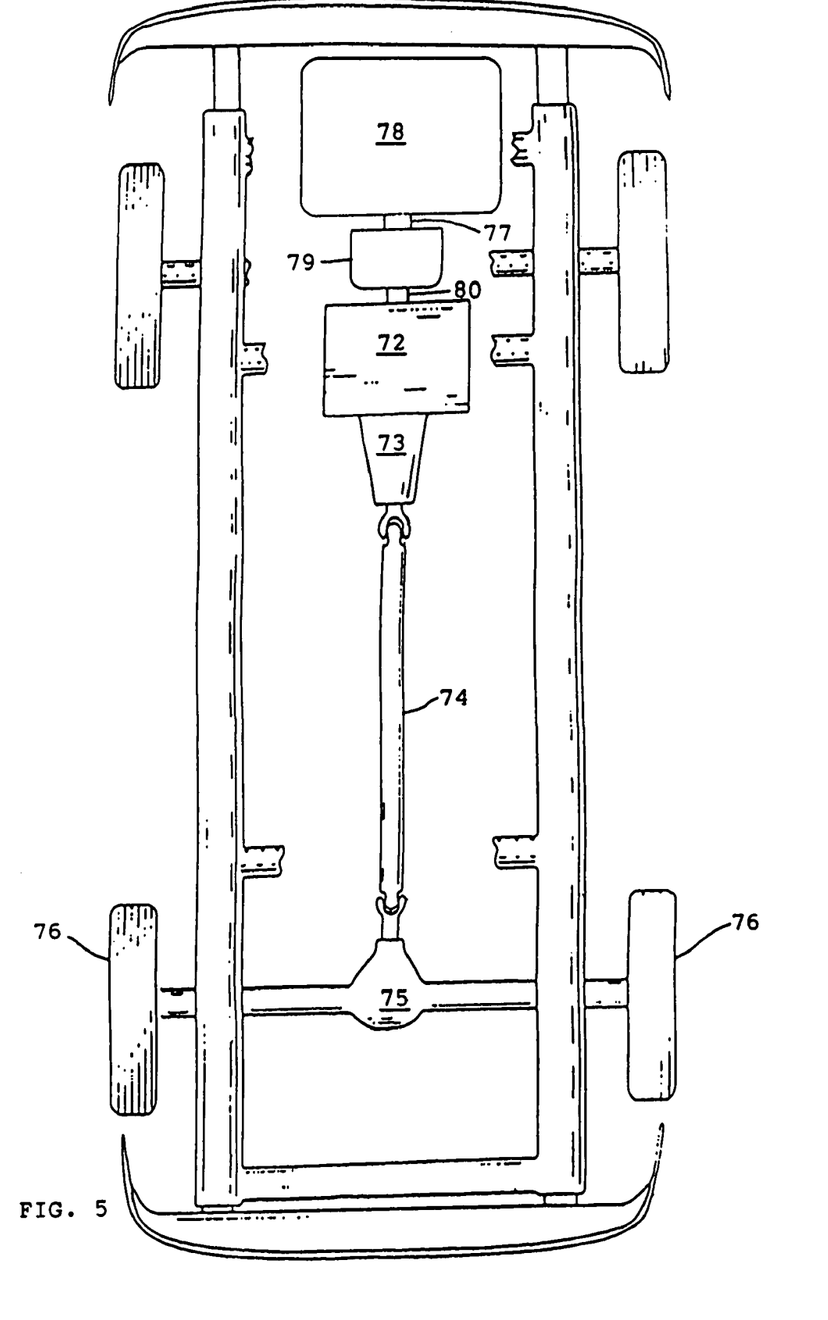
FIG. 5 is a schematic top view of a fourth alternative embodiment of the fuel-efficient vehicle of the present invention.

In FIG. 5, primary engine 72 is mated to transmission 73, propeller shaft 74, differential 75 and drive wheels 76 in the usual manner. The output shaft 77 of accelerator engine 78 is coupled to electromagnetic power clutch 79, thence to front end 80 of the crankshaft of primary engine 72.

To operate the vehicle, both engines 72 and 78 are started, the transmission 73 engaged, electromagnetic power clutch 79 is engaged and both engines are speeded up to urge the vehicle forward in the usual manner. After the vehicle reaches cruising speed, electromagnetic power clutch 79 is disengaged and at the same time accelerator engine 78 is throttled down or stopped altogether to save fuel. When more power is needed, the accelerator engine is simply restarted and/or speeded up, and at the same time electromagnetic power clutch 79 is engaged to provide added power as needed.

Figure 6:
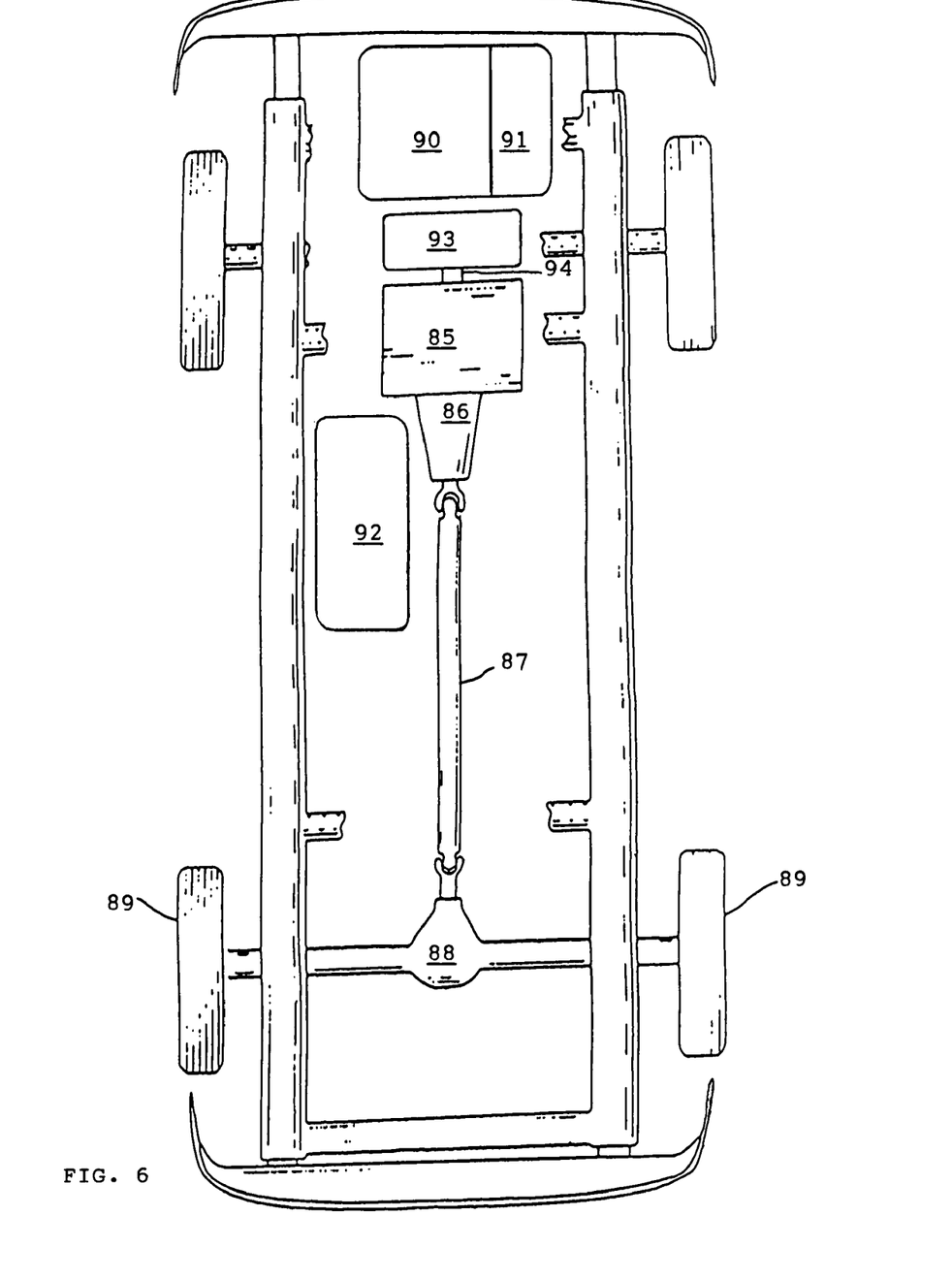
FIG. 6 is a schematic top view of a fifth alternative embodiment of the fuel-efficient vehicle of the present invention.

In FIG. 6, primary engine 85 is mated to transmission 86, propeller shaft 87, differential 88 and drive wheels 89. Accelerator engine 90 is coupled to generator 91 which supplies power to battery 92 and electric motor/generator 93 whose output shaft 94 is integral with the forward extension of the crankshaft of primary engine 85. In the motor mode, motor/generator 93 can be powered by both generator 91 and battery 92. In the generator mode, regenerative braking can supply electricity to charge battery 92. Said generator 91, and motor/generator 93 represent additional components of a coupling means assembly for producing the sought interaction between the two engines.

To operate the vehicle, primary engine 85 is started and transmission 86 is engaged. Primary engine 85 is then speeded up to urge the vehicle forward in the usual, manner. To permit the vehicle to accelerate faster, increasing amount of current from battery 92 is fed into motor/generator 93, which is placed in the motor mode, to produce supplemental power to assist primary engine 85 in moving the vehicle forward in a faster rate of acceleration. The flow of current from battery 92 can be controlled by a rheostat which is controlled by a rheostat pedal placed alongside the gas pedal. This allows the operator to produce increasing amount of power from both the primary engine 85 and electric motor 93 by simply depressing both pedals simultaneously. After cruising speed is attained, the operator may then elect to travel economically on power from the primary engine 85 alone by simply releasing the rheostat pedal.

Auxiliary accelerator engine 90 may be programmed to be automatically started whenever battery 92 is discharged to a predetermined degree so that the battery 92 will be kept constantly fully charged by generator 91. The power output of accelerator engine 90, and the generating capacity of generator 91 is adjusted so that they are able to keep pace with the power requirement of motor 93 even when motor 93 is operated steadily at peak capacity. This assures that the vehicle can be operated at peak power capacity (peak combined power of the primary engine 85 and motor 93) for prolonged periods, such as during prolonged uphill climbs. This is an improvement over prior hybrid vehicles which lose power when the batteries are discharged. Additionally, since the charge in battery 92 is constantly replenished by generator 91, battery 92 need not be of very high capacity. Less expensive 12 volt lead-acid batteries may prove adequate and practicable.

This embodiment has the added advantage of further improving fuel economy through regenerative braking. This is done by means of automatically reversing the polarity of motor/generator 93 to place it in generator mode whenever the brake pedal is depressed while keeping the transmission engaged so that the momentum of the vehicle will spin the crankshaft of primary engine 85 and the armature of generator 93 to generate electricity to charge battery 92, a system that is well known in the art.

Figure 7:
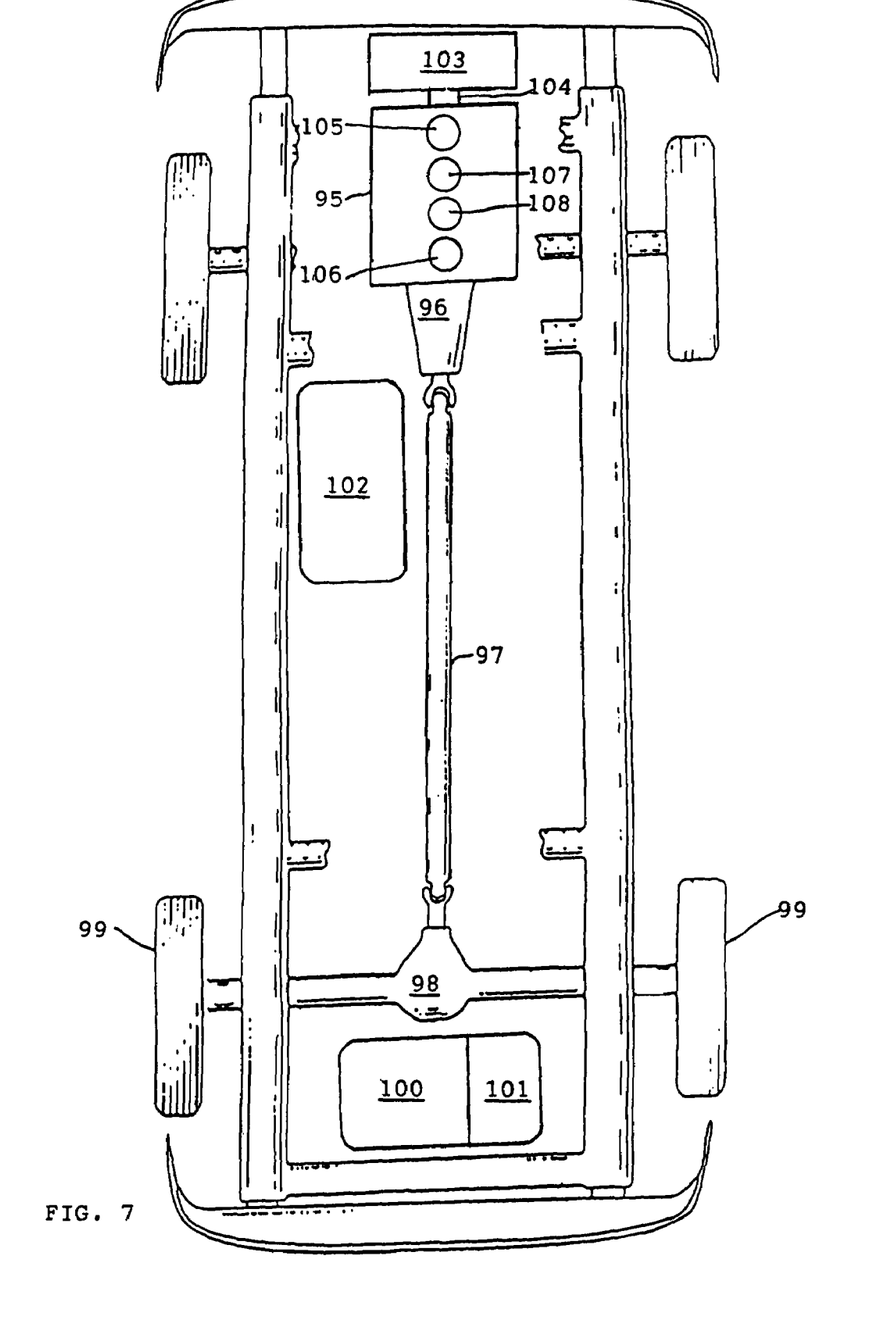
FIG. 7 is a schematic top view of a sixth alternative embodiment of the fuel-efficient vehicle of the present invention.

FIG. 7 illustrates how this invention may be retrofitted into an existing vehicle. In this embodiment, the vehicle's original power train includes a primary four-cylinder engine 95, transmission 96, propeller shaft 97, differential 98 and wheels 99. Accelerator engine 100 drives generator 101 which charges battery 102 and also supplies power to motor/generator 103 fixedly connected to the front end of the crankshaft of engine 95. The original primary engine 95 is modified by removing the pistons and connecting rods and other associated moving parts in the front cylinder 105 and rear cylinder 106 and shutting off the air supply and fuel supply to these two cylinders 105 and 106. The engine is now effectively down-sized to a two-cylinder engine operating on the remaining cylinders 107 and 108. This method of deactivating half the cylinders in an engine for economical operation, such as for cruising, is an improvement over the prior art which simply deprives the deactivated cylinders of fuel without removing the pistons and con rods whose continued reciprocating motion produces internal and frictional drag to sap the power of the remaining functioning cylinders.

As in the embodiment of FIG. 6, generator 101 and motor generator 103 represent components of a coupling means assembly for producing the sought interaction between the two engines.

To operate the vehicle, the regular engine 95 is started and transmission 96 is engaged. Engine 95 is speeded up to urge the vehicle forward in the usual manner. To permit the vehicle to accelerate faster increasing amount of electric current from battery 102 is fed to motor/generator 103, which is placed in the motor mode, to produce supplemental power to assist engine 95 in moving the vehicle forward in a faster rate of acceleration. The flow of current to motor/generator 103 is controlled by a rheostat which is operated through a rheostat pedal placed alongside the gas pedal. By depressing both pedals simultaneously the operator can accelerate the vehicle on power from both engine 95 and electric motor 103. To cruise economically he simply releases the rheostat pedal and operates the vehicle on power from engine 95. For passing or hill-climbing he simply depresses both pedals together, as needed.

Accelerator engine 100 may be programmed to start and stop as needed to keep battery 102 fully charged at all times, and the brake system modified to employ motor/generator 103 for regenerative braking as described above.

Although FIG. 7 illustrates a vehicle with a four-cylinder engine, the same method of down-sizing the existing engine may be used to similarly down-size a six-cylinder engine or an eight-cylinder engine, in a process which will be easily performed by persons skilled in the art.

Although specific types of clutches have been illustrated and described as components of the coupling means, other suitable types of clutches, releasable couplings and torque converters may be used, such as dry plate clutches, cone clutches and toroidal torque converters. Furthermore any of these clutches may be designed to be automatically actuated using load and speed sensors in association with programmed computerized vehicle management systems.

Although the preferred embodiments are described in great detail, it is to be understood that various changes and modifications may be made therein without departing from the scope of the invention as defined in the appended claims.

Having thus described my invention, what is claimed is:

1. An automotive vehicle having power train means comprising:
   a) a primary internal combustion engine having sufficient power to maintain said vehicle at cruising speed and equipped with a crankshaft having front and rear ends,
   b) an auxiliary internal combustion engine having an output shaft, and having a power sufficient, when combined with the power of said primary engine, to impart acceleration to said vehicle,
   c) coupling means releasibly interactive between said output shaft and the front end of said crankshaft, and
   d) speed change transmission means associated with the rear end of said crankshaft, whereby
   e) power from said auxiliary engine may be selectively conveyed to said crankshaft to supply additional power for accelerating said vehicle, and
   f) after the vehicle reaches cruising speed, the auxiliary engine may be disengaged from said crankshaft and throttled down or stopped altogether to conserve fuel, thereby
   g) enabling said vehicle to travel at cruising speed with reduced fuel consumption on power provided by said primary engine alone, and
   h) enabling said auxiliary engine to remain ready to be reactivated whenever increased power is needed, said vehicle being further equipped with a rechargeable storage battery interactive with said power train means, and separate gas pedals for the control of said primary and auxiliary engines.

2. The vehicle of claim 1 wherein said crankshaft is of high capacity construction designed to withstand the combined power from said primary and auxiliary engines.

3. The vehicle of claim 1 wherein the output shaft of said auxiliary engine and the crankshaft of said primary engine are in coaxial alignment.

4. The vehicle of claim 1 wherein said power train means contains an electric motor adapted to add power to said primary engine.

5. A process for modifying an existing automotive vehicle for the purpose of improving its fuel economy, said vehicle having an existing internal combustion engine equipped with multiple cylinders symmetrically positioned with respect to a center axis, and having a crankshaft extending between front and rear ends, said process comprising:
   a) deactivating two or more of said cylinders while preserving the positional symmetry of the remaining cylinders, said deactivation including removal of moving components interactive with said cylinders,
   b) adding an auxiliary internal combustion engine capable of variable operational speed independent of said existing engine, and having a rotating output shaft, and
   c) providing coupling means interactive between said output shaft and the front end of said crankshaft for controllably adding the power of said auxiliary engine to the power of said existing engine when the rotational speed of said output shaft is caused to equal the rotational speed of said crankshaft.

6. The vehicle of claim 1 wherein said rechargeable storage battery is a 12 volt lead/acid battery.

* * * * *